April 10, 1962 M. A. WERSTERFER 3,028,920
HARROW CULTIVATOR
Filed Dec. 21, 1959
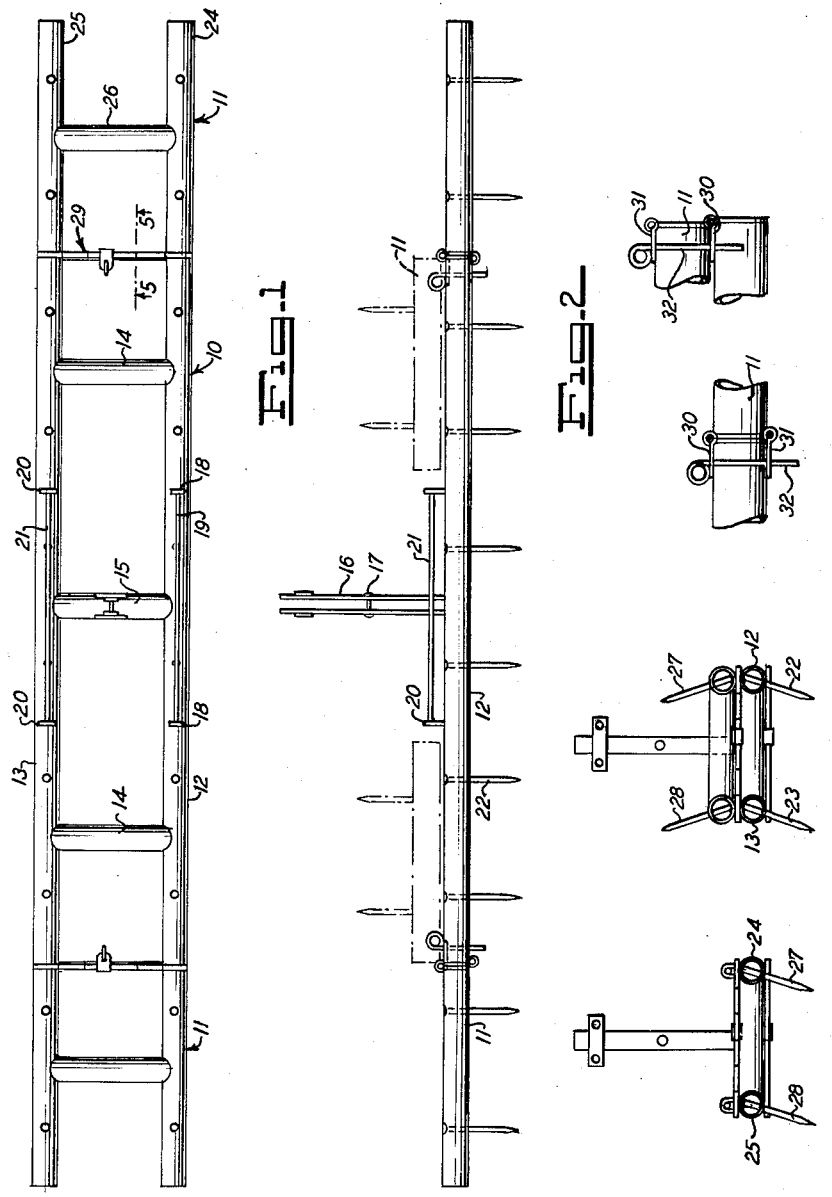
INVENTOR
MELVIN A. WERSTERFER
BY
ATTORNEYS

United States Patent Office 3,028,920
Patented Apr. 10, 1962

3,028,920
HARROW CULTIVATOR
Melvin A. Wersterfer, Rte. 1, Seguin, Tex.
Filed Dec. 21, 1959, Ser. No. 860,933
2 Claims. (Cl. 172—613)

This invention relates to agricultural implements and more particularly to a cultivator of the toothed harrow type which is particularly adapted to be towed behind a tractor or similar vehicle.

It is accordingly an object of the invention to provide a cultivator of the toothed harrow type in which the ground engaging teeth are disposed at an angle to the vertical and in which such angle may be varied or may be reversed.

A further object of the invention is the provision of a cultivator of the toothed harrow type, including a central elongated body portion and foldable extensions on each end of the body portion in order to vary the effective length of the cultivator or to reduce the length of the same for transportation purposes.

A still further object of the invention is the provision of a cultivator of the toothed harrow type, including a central alongated body portion and a foldable extension on each end of the body portion, together with means for locking the extensions in folded or extended position.

Another object of the invention is the provision of a cultivator of the toothed harrow type in which the body or frame, as well as the ground engaging teeth are round in cross section in order to more effectively break-up clumps of earth and also to reduce scattering of such earth.

A further object of the invention is the provision of a cultivator of the toothed harrow type in which the ground engaging teeth are rigid thereby providing earth penetration for the whole length of the teeth.

A still further object of the invention is the provision of a cultivator of the toothed harrow type which may be conveniently coupled to a tractor with either side of the cultivator in a forward position, in order to reverse the angle of the ground engaging teeth.

Further objects of the invention will be apparent from the following description taken in conjunction with the accompanying drawing wherein:

FIG. 1 is a top plan view of a cultivator constructed in accordance with this invention;

FIG. 2 a side elevational view of the cultivator shown in FIG. 1 and showing the foldable extension in extended position in full lines and in folded position in dotted lines;

FIG. 3 an end elevational view of the cultivator of this invention with the extensions in extended position;

FIG. 4 a view similar to FIG. 3, but showing the extensions in folded position;

FIG. 5 a fragmentary sectional view taken on the line 5—5 of FIG. 1 and showing the means for retaining the extensions in extended position; and FIG. 6 a view similar to FIG. 5, and showing the means for retaining the extensions in folded position.

With continued reference to the drawing, there is shown a cultivator of the toothed harrow type constructed in accordance with this invention and which may well comprise a central body portion 10 and foldable extension 11 on each end of the body portion 10.

The body portion 10 may well comprise a pair of spaced parallel tubular bars 12 and 13 of circular cross section and the bars 12 and 13 are secured together by suitable cross members 14 welded or otherwise secured to the bars 12 and 13. A central cross member 15 connects the bars 12 and 13 and midway of the length of the central cross member 15, there is provided an upstanding hitch member 16 which may, if desired, be in the form of spaced parallel flat bars connected by a rivet or bolt 17 as clearly shown in FIGS. 1 and 2. If desired, however, the hitch member 16 may be a single rigid member suitably secured by welding or the like to the central cross member 15 substantially midway of the length thereof. The tubular bar 12 of the central body portion 10 may be provided with upstanding ears 18 disposed on opposite sides of the central cross member 15 and such ears may, if desired, be connected by a rod 19. In a similar manner, bar 13 of the central body portion 10 may be provided with upstanding ears 20 disposed on opposite sides of the central cross member 15 and the ears 20 may also be connected by a rod 21. The hitch member 16, as well as the ears 18 or 20 are utilized to couple the cultivator of this invention to a towing tractor or other vehicle and in this manner, either the bar 12 or the bar 13 of the central body portion 10 may be disposed in a forward position for a purpose to be later described.

The bars 12 and 13 are provided with spaced apertures extending therethrough at an angle to the vertical and ground engaging teeth 22 are secured in the apertures of the bar 12 while ground engaging teeth 23 are secured in the apertures of the bar 13. Such teeth may be driven through the apertures with a tight friction fit and consequently, may be conveniently replaced upon wear or breakage. However, the teeth 22 and 23 may be secured in any other desired or suitable manner. As will be seen from an inspection of FIG. 4, the teeth 22 and 23 extend downwardly from the bars 12 and 13 at an angle to the vertical.

Each of the extensions 11 comprises a pair of spaced parallel tubular bars 24 and 25 of circular cross section disposed in alignment with the bars 12 and 13 of the central body portion 10 and a cross member 26 connects the bars 24 and 25 and is secured thereto by welding or any other suitable means. The bars 24 and 25 are provided with apertures extending therethrough at an angle to the vertical and received in such apertures are ground engaging teeth 27 and 28 which as shown in FIG. 3 are disposed at the same angle to the vertical as the teeth 22 and 23 extending downwardly from the central body portion 10.

Each extension 11 is provided with suitable hinge means 29 hingedly mounting the extension 11 on the body portion 10 and the hinge means 29 may be provided with a lug 30 which is rigidly mounted, as well as a lug 31 which is pivotally mounted to be positioned in alignment with the lug 30 as shown in FIG. 5, when the extensions are in extended position, or moved to a position as shown in FIG. 6 in alignment with the lug 30 when the extensions are in folded position. The lugs 30 and 31 are provided with aligned apertures for removably receiving a pin 32 which serves to releasably secure the extensions in extended or folded position.

In operation, the cultivator of this invention may be coupled to a towing tractor with the bar 13 of the central body portion 10 in a forward position, in which case the downwardly extending ground engaging teeth will be directed forwardly of the cultivator as shown in FIG. 3, and the angle of such teeth may be varied by tilting the entire cultivator by means of the coupling mechanism. Also, if desired, the cultivator may be coupled to the towing tractor with the bar 12 of the central body portion in the forward position, in which case the ground engaging teeth will be directed rearwardly and in a similar manner, such angle may be varied by tilting the cultivator by means of the coupling mechanism. Movement of the cultivator over the ground by means of the towing tractor will result in cultivating the ground by penetration of the ground engaging teeth and also, the round bars comprising the central body portion and the extensions will act to break-up large clumps of earth and furthermore, such earth will not adhere to the round bars or to the round teeth and furthermore, the earth will not be unduly scattered by such bars or teeth, as would be the case if the same were flat or rectangular. The device may be utilized for cultivating the full width provided with the extensions in extended position, or may cultivate a shorter width of the extensions in folded position and, of course, the extensions may be folded for convenient transportation in order to occupy a minimum width. There are no moving parts to become unduly worn and in the event the teeth become worn, the same may be conveniently replaced by driving the same from the apertures and driving new teeth in place. The cultivator of this invention may be conveniently and economically manufactured from readily available materials requiring no highly skilled labor in such construction and consequently, the same may be manufactured at a relatively low cost.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A cultivator comprising a central elongated body portion and a foldable extension on each end of said body portion, said body portion comprising a pair of spaced parallel tubular bars of circular cross section, cross members connecting said bars with a central cross member disposed midway of the length of said bars, an upstanding hitch member fixed midway of the length of said central cross member, spaced upstanding ears on each bar on opposite sides of said central cross member, whereby said cultivator may be coupled to a tractor by means of said hitch member and said ears with either of said bars in a forward position, said bars having spaced apertures extending therethrough at an angle to the vertical and ground engaging teeth fixed in said apertures, each extension comprising a pair of spaced parallel tubular bars of circular cross section disposed in alignment with the bars of said body portion, a cross member connecting said last named bars, said last named bars having apertures extending therethrough at an angle to the vertical and ground engaging teeth fixed in said last named apertures, each extension being hingedly mounted on said body portion for movement from an extended position to a folded position super-imposed on said body portion and means for releasably securing each extension in extended or folded position.

2. A cultivator as defined in claim 1, in which said securing means comprises aligned lugs on each extension and said body portion, said lugs having aligned apertures and removable pins received in said aligned apertures.

References Cited in the file of this patent

UNITED STATES PATENTS

| | | |
|---|---|---|
| 635,746 | Cochran | Oct. 31, 1899 |
| 1,404,544 | Rettig | Jan. 24, 1922 |
| 1,563,261 | Curtis | Nov. 24, 1925 |
| 2,617,343 | Warne | Nov. 11, 1952 |
| 2,654,197 | Peterson | Oct. 6, 1953 |
| 2,859,577 | Presler | Nov. 11, 1958 |

FOREIGN PATENTS

| | | |
|---|---|---|
| 1,002,778 | France | Nov. 7, 1951 |